(No Model.)
W. W. PATTERSON.
SELF OILING SHEAVE FOR PULLEY BLOCKS.
No. 304,448. Patented Sept. 2, 1884.
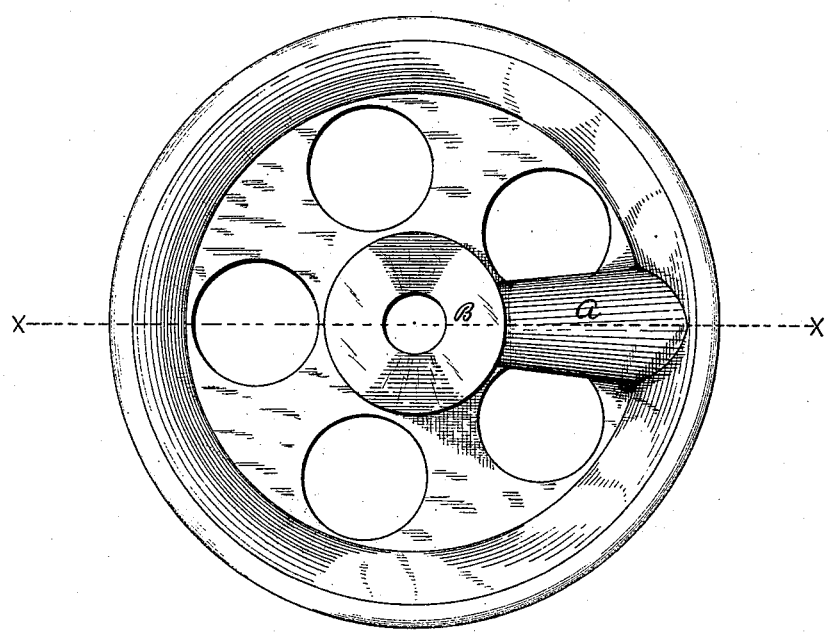
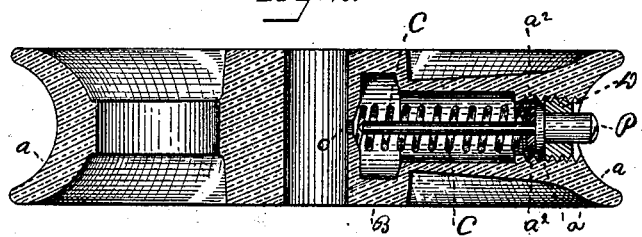
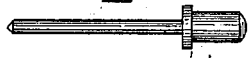
Witnesses:
E. J. Lowry,
Inventor:
William W. Patterson
by atty L. H. P. Potter

UNITED STATES PATENT OFFICE.

WILLIAM W. PATTERSON, OF ALLEGHENY, PENNSYLVANIA.

SELF-OILING SHEAVE FOR PULLEY-BLOCKS.

SPECIFICATION forming part of Letters Patent No. 304,448, dated September 2, 1884.

Application filed June 23, 1884. (No model.)

*To all whom it may concern:*

Be it known that I, WILLIAM W. PATTERSON, of Allegheny, county of Allegheny, State of Pennsylvania, have invented or discovered a new and useful Improvement in Self-Oiling Sheaves for Pulley-Blocks; and I do hereby declare the following to be a full, clear, concise, and exact description thereof, reference being had to the accompanying drawings, making a part of this specification, in which—like letters indicating like parts—

Figure 1 represents a side elevation of a sheave for a pulley-block, having an arm, A, enlarged and hollow, for the purpose of illustrating my invention. Fig. 2 is a view in horizontal section of the sheave, taken in the plane of the line $x\,x$ in Fig. 1. Fig. 3 is a view of the agitating-pin or piston-rod which I employ in forcing out and in controlling the deposit upon the shaft of the oil or grease from the hollow chamber of the arm A; and Fig. 4 is a top view of the pin-head or agitating-rod, showing the manner in which the screw-plug is inserted in the rim or groove of the sheave to hold the agitating-pin in place.

The object of my invention is to provide a self-oiling sheave for pulley-blocks; and to this end my invention consists in providing the sheave with an enlarged and hollow arm, A, which is filled with hard grease or oil, and placing inside this hollow arm means for regulating the supply of oil, which finds access to the pin or shaft upon which the sheave turns, by means of a small hole through the hub of the sheave and connecting with the interior of the hollow arm A.

To enable others skilled in the art to practice my invention, I will describe more fully and in detail its construction and mode of operation.

Around the periphery of the wheel, as in all sheaves, runs a groove, $a$, and in this groove runs the rope. At every revolution of the sheave the rope running in the groove $a$ will press upon the head of the agitating-pin P and depress it, causing it to enter the opening $o$, which leads through the hub B to the shaft which is to be oiled. As soon as the sheave has turned around sufficiently to release the pressure of the rope from the head of the agitating-pin, the pin is thrown back again by the coiled spring C, upon which it rests, causing the shoulder $a'$ to fit closely against the lower end of the screw-plug D, which is preferably made of brass, and is ground smooth, so as to make a tight joint. I also add to the agitating-pin a small leather washer, $a^2$, fitted closely to the shoulder $a'$, which causes the pin to perform the office of a piston and piston-rod by forcing the oil out through the small opening $o$ at the bottom of the chamber when the pin is pressed down by the rope, and also by means of the suction, when the coiled spring C forces the pin back, drawing back the surplus oil and preventing the escape of more than the needful quantity. The hollow chamber of the arm A being filled with hard grease or oil, at every revolution of the sheave the agitating-pin P will be forced down by the pressure of the rope in the sheave, causing the point of the pin which rests in the edge of the opening to go almost through the opening $o$, and depositing a small quantity of oil upon the shaft. The pressure being removed from the head of the pin, the coiled spring at once forces it up to its place, and the suction caused by the shoulder of the pin and the washer working in their seats draws back into the chamber any surplus oil that may have been forced out. It is only necessary to give the agitating-pin a very small amount of play, as a very minute quantity of oil deposited each revolution of the sheave will be amply sufficient for all practical purposes; and to aid in guarding against too much oil coming out, I am careful to make the opening $o$ but a very little larger than the end of the agitating-pin which enters it.

In casting the sheave I cast it with arm A enlarged and hollow, and I cast it with a rough hole through the rim of the sheave from the groove to the hollow chamber, and then ream the hole out, cut a thread of sufficient depth in it, and fit into it the screw-plug D, which, as I said before, is preferably made of brass, and which is made to fit snugly the head of the agitating-pin. Care is also taken to see that in adjusting the shoulder and the washer of the agitating-pin to their seats they be not fitted so tightly as to interfere with the work of the coiled spring C in forcing them back to place after they have been pressed down by the passage of the rope in the sheave.

What I claim herein as my invention, and desire to secure by Letters Patent, is—

1. In sheaves for pulley-blocks, a self-oiling mechanism, constructed substantially as described, and adapted to be operated by the pressure of the rope in the groove of the sheave, for the purpose set forth.

2. In sheaves for pulley-blocks, a self-oiling mechanism, substantially as described, operated by the pressure of the rope in passing around the groove upon an agitating-pin working through a hollow arm of the sheave to its hub, substantially as shown and described.

3. In self-oiling sheaves for pulley-blocks, the spring agitating-pin having a reciprocating movement, and forced in one direction by pressure of the rope upon its head in the groove of the sheave, and forced in the opposite direction by the pressure of the coiled spring upon which it sits and by which it is surrounded, substantially as described.

4. In self-oiling sheaves for pulley-blocks, an agitating-pin working in a hollow chamber in one of the arms of the sheave, and having on it a shoulder and a leather washer, and surrounded by and seated upon a coiled spring, arranged substantially as shown and described.

5. In a self-oiling sheave for pulley-blocks, an agitating-pin whose head extends into the groove of the sheave, and which is supported by a shoulder resting upon a coiled spring, and which pin, when depressed by the passage of the rope in the groove around the sheave, automatically causes the deposit of a small quantity of oil or grease upon the shaft at the center of the sheave upon each revolution of the sheave, substantially as set forth and described herein.

In testimony whereof I have hereunto set my hand.

WILLIAM W. PATTERSON.

Witnesses:
JOS. H. JACOBS,
JOHN H. ECOFF.